June 9, 1942.    G. W. HAUG ET AL    2,286,091
X-RAY TUBE AND SYSTEM THEREFOR
Filed July 22, 1939    2 Sheets-Sheet 1

Inventors:
George W. Haug,
Harry B. McEuen,
By Cushman, Darby & Cushman
Attorneys.

Patented June 9, 1942

2,286,091

UNITED STATES PATENT OFFICE 2,286,091

X-RAY TUBE AND SYSTEM THEREFOR

George W. Haug and Harry B. McEuen, Jacksonville, Fla.

Application July 22, 1939, Serial No. 286,027

14 Claims. (Cl. 250—102)

This invention relates to the production of X-rays by means of an alternating current supply, it being the particular object hereof to provide an electrical circuit and improved X-ray generator adapted to utilize both the positive and negative halves of each single cycle of alternating current. It is a further object of this invention to provide a novel X-ray generator functioning to generate X-rays from the peak voltages of both halves of each single cycle of alternating current and to suppress the flow of electrons in the generator during the remainder of each half cycle, whereby a greater quantity of useful X-rays are produced for a given current value than is possible with any known prior art device. Other objects will appear more fully below.

Figure 1:
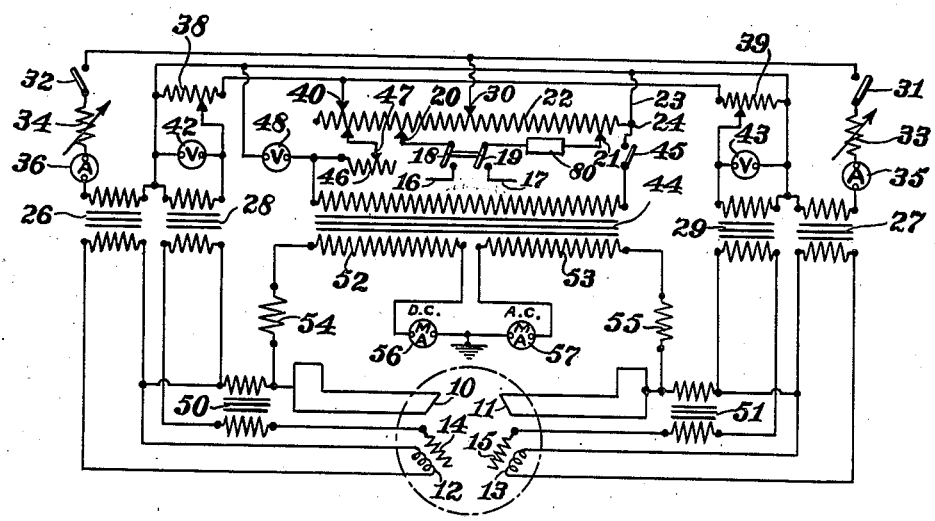
Figure 1 is a diagram of one form of the X-ray generator and circuit.

In practicing this invention, an X-ray generator is provided which has two anodes 10 and 11 and which also has two cooperating filaments or cathodes 12 and 13. In the construction shown, positioned between the cathode 12 and anode 11 is a grid 14 and positioned between cathode 13 and anode 10 is another grid 15. X-ray generators constructed in accordance with this teaching are adapted to receive a full cycle of alternating current and by means of a circuit to be described below, the generator is caused to function such that both the positive and negative half of each cycle is utilized to cause X-rays to be generated at the anodes. It is known that in using an alternating current in an X-ray tube to cause X-rays to be generated, that the most beneficial rays are generated during the peak voltage of the half cycle. The present apparatus is designed to generate X-rays at substantially the peak voltage of each half cycle and is further adapted to suppress the generation of X-rays when the voltage falls below that which is effective to produce beneficial X-rays.

The following circuit shown in Figure 1 is adapted to receive an alternating current supply to energize the above-described X-ray generator.

The alternating current supply leads 16 and 17 are connected through switches 18 and 19 respectively to the variable connections 20 and 21 of the auto transformer 22. A lead 23 is taken from connection 24 of the auto transformer to the primaries of filament transformers 26 and 27 and to the primaries of grid bias transformers 28 and 29. A variable connection 30 is provided to connect the other end of the primaries of the filament transformers 26 and 27 to the auto transformer 22, the connection 30 being variable so that the desired filament voltage may be obtained. The variable connection is electrically connected to the primary of filament transformer 27 through switch 31, regulator 33, which is preferably a resistance type but may be an induction regulator, and ammeter 35 and to the primary of the filament transformer 26 through switch 32, regulator 34 of the same resistance or induction type as regulator 33, and ammeter 36. The other side of the primaries of grid bias transformers 28 and 29 are connected to the auto transformer 22 through the variable auto transformers 38 and 39, respectively, which are adapted to control the voltage supplied to each of the grid bias transformers, the auto transformers 38 and 39 being electrically connected between connection 24 and variable connection 40 of the auto transformer 22. Connected across the leads to each of the grid bias transformer primaries are volt meters 42 and 43.

A high tension transformer 44 is provided, the primary of which is connected through switch 45 to connection 24 of auto transformer 22, the other end of the primary of this transformer being connected to the auto transformer 22 through the resistance 46 and the adjustable connection 47. A volt meter 48 is connected across the leads to the primary of the high tension transformer.

The secondary of the filament transformer 26 is connected to the cathode or filament 12 and the secondary of the other filament transformer 27 is connected to the cathode 13. One side of the secondary of the grid bias transformer 28 is connected to the grid 14 through the secondary of a grid cut-off transformer 50, the other side of the secondary of this grid bias transformer 28 being connected to the primary of the grid cut-off transformer 50. The secondary of grid bias transformer 29 is interconnected with the grid 15 and the grid cut-off transformer 51 in a like manner. The secondary of the filament transformer 26 is also connected to the primary of the grid cut-off transformer 50, the other side of the primary of the grid cut-off transformer 50 being connected to the circuit of anode 10.

The secondary of filament transformer 27 and the primary of grid cut-off transformer 51 are similarly interconnected with the circuit of anode 11. One side 52 of the tapped secondary of the high tension transformer is connected at one end through the surge resistor 54 to the primary of the grid cut-off transformer 50, the other end being grounded through the direct current milliammeter 56. The other side 53 of the tapped secondary is connected through surge resistor 55 to the primary of cut-off transformer 51 and its other end is grounded through the A. C. milliammeter 57.

The above circuit being established, the supply lead switches 18 and 19 are closed so that the auto transformer 22, grid bias transformers 28 and 29 and high tension transformer 44 will be energized and the filament transformer switches 31 and 32 are closed to render the X-ray generator operative. The current supply to the cathodes or filaments 12 and 13 is primarily selected by the adjustable connection 30 and each individual filament circuit is further regulated by means of the adjusting means 33 and 34 so that ammeters 35 and 36 show the proper current in the primaries of filament transformers 26 and 27. The grid bias transformers 28 and 29 are primarily adjusted by the adjustable connection 40 and a final voltage adjustment is made by regulating the auto transformers 38 and 39 so that volt meters 42 and 43 show the proper voltage in their primaries.

The switch 45 being closed, the proper input to the primary of the high tension transformer 44 is obtained by adjustment of the variable resistance 46 and adjustable tap 49 so that the desired voltage is indicated on the volt meter 48.

When the circuit has been properly balanced as described above, the direct current milliammeter 56, which reads the difference between the current flowing in the circuit of anode 10 and of anode 11 during their respective periods of operation, will read zero, thus indicating that the current supply to each anode circuit is the same. The alternating current milliammeter 57 will indicate the sum of the current flowing in both anode branches of the circuit and the circuit is adjusted by it until the desired amperage is obtained at the anodes, so that the proper quantity of X-rays or r./min. will be generated.

In the operation of the X-ray generator when the voltage is below that required to produce the proper quality of X-ray, the grid bias voltage on grids 14 and 15 is sufficient to suppress the emission of any electrons from the cathodes to the anodes so that no X-rays can be generated at this time. However, during the alternating current cycle the grid bias is controlled so that as the voltage during each half cycle approaches its peak the bias charge diminishes until its suppressing effect is overcome. It continues to diminish as the voltage in the half cycle increases and approaches a minimum as the peak is reached, to permit a maximum flow of electrons during the periods of peak voltage when the most useful rays are being generated. The reverse is true as the voltage decreases from its peak, i. e. the grid bias builds up as the voltage decreases so that the bias voltage is finally built up until it is effective to suppress the emission of electrons when the voltage drops below that required to produce the desired quality of X-rays.

The current which an X-ray tube will stand during operation is a limiting factor in its output of X-rays. The grid, in suppressing the flow of electrons when the voltage is not sufficiently high, controls the current flow through the generator and permits current to be drawn only when X-rays of the desired quality are being produced. As above explained, only a portion of each positive and negative half cycle of the alternating current supply is utilized in producing X-rays and it is apparent that an amperage flow through the generator occurs only during the time that X-rays are actually being generated whereby the greatest possible generation of the X-rays for a given average amperage is approached.

As the voltage increases from zero to a maximum the anode 10, cathode 12, and grid 14, for instance, become positive with respect to anode 11, cathode 13 and grid 15. During this increase, the potential difference between anode 10 and cathode 13 increases, however, the tendency of electrons to flow from the cathode or filament 13 is suppressed by the bias charge on grid 15 until a predetermined potential difference is attained and then the suppressing charge on the grid is overcome and electrons are emitted from the cathode 15 to be attracted to the anode 10 to produce the X-rays. The voltage in the primary of the grid cut-off transformer 51 increases with the increase in potential difference and thus an increasing current is induced in the secondary of the cut-off transformer.

The direction of the current induced in the secondary of the grid cut-off transformer is opposed to that being impressed upon the grid by the grid bias transformer 29 so that it tends to neutralize the bias charge ordinarily maintained on the grid and the bias charge is continually diminished as the voltage increases. As the voltage in the half cycle decreases from the maximum, the charge on the grid is gradually built up until, when the voltage decreases to such an extent that the proper quality of X-rays can no longer be generated, the grid bias has again been built up to such a point that it is effective to entirely suppress all flow of electrons.

During the next half cycle the anode 11 becomes positive with respect to the cathode 12 and grid 14, grid cut-off transformer 50 being operative to vary the bias charge to control the flow of electrons from the cathode to the anode. The function of grid cut-off transformer 50 is the same as that of the grid cut-off transformer 51 and is connected into the circuit of grid bias transformer 28 to control the grid bias in the same manner.

It is then seen that during one half the cycle the anode 10 and cathode 13 cooperate to generate X-rays and during the other half of the same cycle cathode 12 emits electrons which impinge upon anode 11 to generate X-rays. The circuit and X-ray generator are operative, as above described, to convert the energy of the alternating current into X-rays without the aid of separate rectifying means. The grid cut-off transformers 50 and 51 may be omitted. However, they are adapted to obtain a fine control of the quality of the X-rays, as above explained and are used in the preferred construction.

Figure 2:
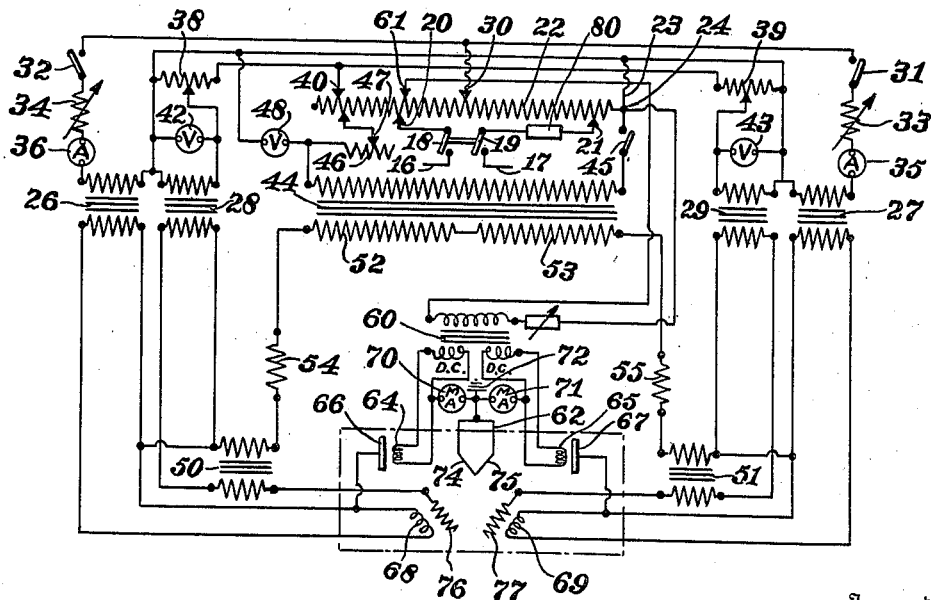
Figure 2 is a diagram of a modification of the X-ray generator and circuit shown in Figure 1.

In Figure 2 a circuit is shown having different characteristics than that described in connection with Figure 1. In this circuit the primaries of all the transformers are connected exactly as those shown in Figure 1 with the exception of the grid cut-off transformers 50 and 51 and in addition another transformer, namely, rectifier filament transformer 60, has its primary connected into the circuit through the adjustable tap 61 and fixed connection 24 of the auto transformer 22. The primaries of the cut-off transformers 50 and 51 are not connected to the anode circuit as in Figure 1, a single anode 62 being provided which is energized by a rectifier system as will appear more fully below.

The secondaries of all the transformers are connected as described in the circuit shown in Figure 1, however the secondaries of the filament transformers 26 and 27 and of the grid bias transformers 28 and 29 being connected to the primary of the grid cut-off transformers 50 and 51, they are not directly in circuit with the anode 62 shown in Figure 2.

The V-shaped anode 62 is energized by the rectifier circuit shown in Figure 2 where the tapped secondary of the rectifier filament transformer 62 serves to maintain a supply of heating current to the filaments 64 and 65 of the rectifying elements. The anodes or plates 66 and 67 of the rectifier circuit are connected to the circuits of cathodes 68 and 69 respectively of the X-ray generator. The anode of the X-ray generator is connected between the leads to both the filaments 64 and 65 of the rectifier, the D. C. milliammeters 70 and 71 being connected between the anode and the filaments 64 and 65 respectively. The anode circuit of the X-ray generator may be grounded at 72 and the circuit operates in the following manner.

During one half the cycle, the cathode 68 is positive with respect to cathode 69 and anode 66 of the rectifier circuit being connected to cathode 68 of the X-ray generator, it is positive also. The grid cut-off transformers 50 and 51 operate exactly as described in connection with the circuit shown in Figure 1 and when the potential difference between the cathode 69 and surface 75 of anode 62 of the X-ray generator reaches such a degree that the proper quality of X-rays will be generated, the suppressing effect of grid 77 is overcome and electrons are permitted to flow from the cathode to the anode. The circuit will continue through the anode 62 of the X-ray generator, through the meter 70 to the rectifier cathode 64 and from there to the rectifier anode 66 which is maintained, as above explained, at a relatively positive potential.

During the next half cycle the electrical charges on the various elements are reversed and cathode 69 is at a relatively high positive potential and cathode 68 is at a negative potential. The grid 76 is operative as explained above to suppress the flow of electrons until the proper potential exists and when its suppressing charge is overcome, flow takes place between cathode 68 and surface 74 of anode 62. The anode circuit then continues through meter 71 to rectifier filament 65 and rectifier anode 67 which is at the same positive potential as cathode 69 of the X-ray generator.

The primary circuits of the transformers shown in Figure 2 are balanced by meters 35, 36, 42, 43, and 48 in the same manner as that shown in Figure 1. The operation of the anode of the X-ray generator is indicated by the D. C. milliammeters 70 and 71 which indicate the total current flowing in this circuit during each half cycle and as each meter is responsive respectively to the alternate half cycles, the anode circuit may be properly balanced.

If desirable, by changes in the circuit obvious to those skilled in the art, the X-ray generator disclosed in Figure 2 could be constructed with a single cathode and a plurality of anodes. The generator would be adapted to be connected into a circuit operating on the same principles substantially as suggested above. As shown in Figure 2 the rectifier filaments and plates 64 and 66, and 65 and 67 are built into the same envelope that encloses the X-ray generating means. It is contemplated that these rectifier units may be separate units being only electrically connected to the X-ray generating means.

Figure 3:
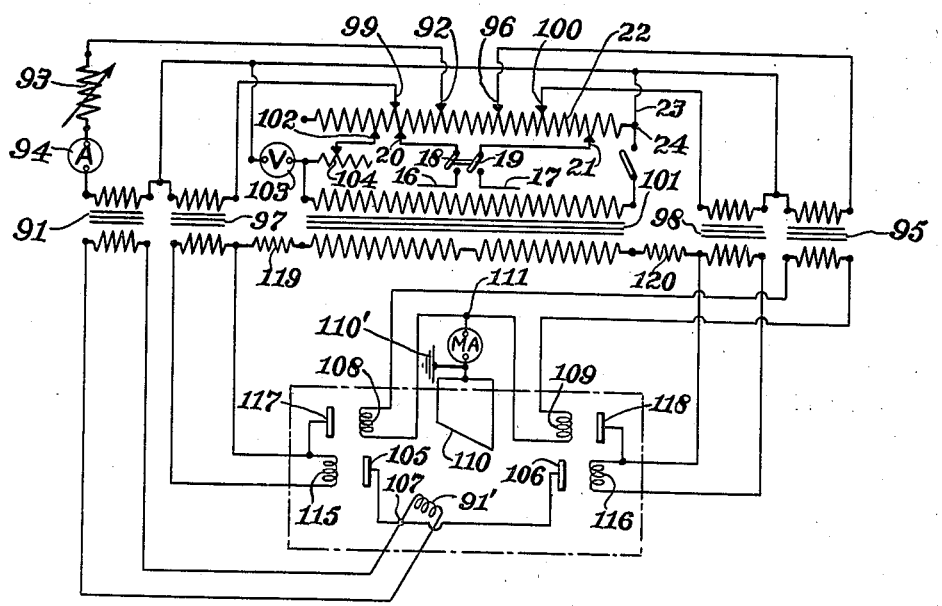
Figure 3 is another modification of the circuit diagrammatically shown in Figure 1.

If it is desired to use the principle herein disclosed for radiography or fluoroscoping, the circuit shown in Fig. 3 may be used. In this device the auto transformer 22 is energized in the before-described manner and filament transformer 91 has its primary connected across adjustable tap 92 and connector 24 of the auto transformer. A regulator 93 and ammeter 94 are connected in series with the primary of filament transformer 91 in order that the quantity r./min. of X-rays generated may be controlled. Anode transformer 95 is connected between the adjustable tap 96 and connector 24 of the auto transformer, and rectifier transformers 97 and 98 are connected between adjustable taps 99 and 100 respectively and connector 24 of the auto transformer. The primary of the high tension transformer 101 is connected between adjustable tap 102 and connector 24 of the auto transformer and has a volt meter 103 connected across these leads. A variable resistance 104 may be provided to control the primary of the high tension transformer 101.

The secondary of the filament transformer 91 is connected in series with the filament 91' of the X-ray generator and has plates 105 and 106 of a rectifying means connected to one side of the filament as shown at 107. The secondary of the anode transformer 95 in the preferred hook-up is connected in series with the filaments 108 and 109 of the rectifying means and the anode 110 is connected into this circuit between these filaments at 111. The anode may be grounded as shown at 110' and a milliammeter is provided to indicate the current flowing in the anode circuit. In a modification of this filament arrangement, the secondary of the anode transformer 95 may be split and a separate circuit provided to each filament. In this instance a meter would be connected between each such separate circuit and the anode. The secondaries of each of the rectifier transformers 97 and 98 are connected in series with filaments 115 and 116 respectively which each have the respective plates 117 and 118 connected to one side thereof. The secondary of the high tension transformer 101 is connected to one side of the secondary of each of the rectifier transformers 97 and 98 through the surge resistors 119 and 120 respectively.

This circuit being established and energized, the device operates in the following manner. During one-half of the alternating current cycle, the filament 116 and plate 118 will be positive with respect to the filament 115 and plate 117 of the rectifying means so that a current flow will take place between filament 115 to plate 105 and an electron stream is caused to flow from the filament 91' to the anode 110. The circuit continues from anode 110 through the milliammeter to the filament 109 and plate 118 to the positive side of the secondary of the high tension transformer 101. During the other half of the cycle, filament 115 and plate 117 will be positive with respect to filament 116 and plate 118 and the current flow will take place between filament 116 and plate 106 causing an electronic flow from filament 91' to the anode. The flow will continue through anode 110, the milliammeter, the filament 108 to plate 117 which is at this time connected to the positive side of the secondary of the high tension transformer 101.

The rectifying means including the filaments 108, 109, 115 and 116 and plates 117, 118, 105 and 106 are all adapted to be sealed within the same envelope with the filament and anode of the X-ray generator. The leads to the various elements of the X-ray generator and rectifier elements must necessarily be insulated from each other for the high potential used. It is thus seen that an extremely simple circuit and rectifying apparatus is provided which is compact and adapted to accomplish the generation of X-rays with the positive and negative halves of each cycle of alternating current.

Figure 4:
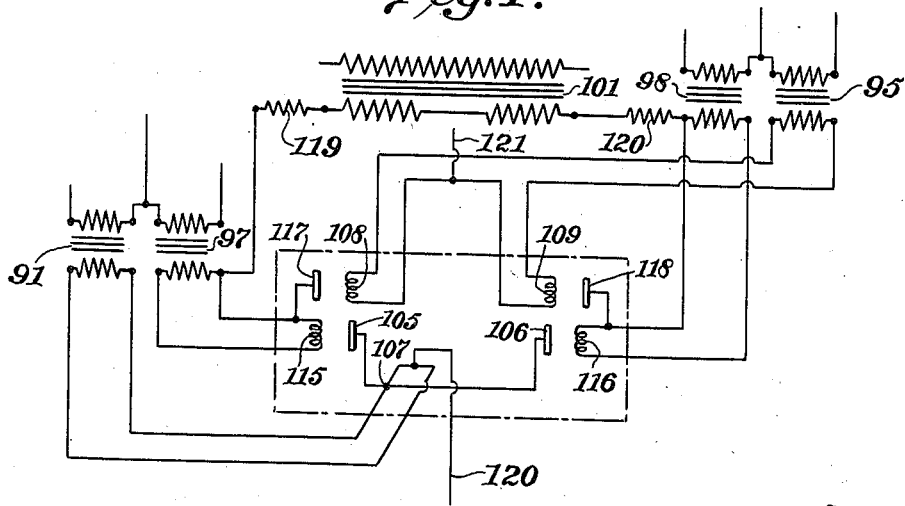
Figure 4 is a diagram of the circuit shown in Figure 3 disclosing its use as a full wave rectifier.

If desired the filament 91' and anode 110 may be omitted and the device will be operative as a rectifier to deliver full wave rectification. This circuit is shown in Figure 4 and the lead 120 replaces filament 91' and lead 121 is substituted for anode 110. The circuit shown in Figure 4 is operative like that shown in Figure 3 except that the rectified current will flow out lead 120 to the circuit requiring such current, the flow returning through lead 121.

In the construction of either of the X-ray generators or rectifiers suggested in connection with these systems, in the preferred circuit it is understood that all the cooperating elements are to be built into a single envelope. However, in accordance with the teaching of the prior art, each filament and plate device may be built into an individual envelope and connected into the circuit arrangement here shown to perform the function of the present invention.

The circuit and X-ray generator shown in Figure 1 is preferred for therapeutic uses. This construction, using two anodes may be more efficiently cooled thus permitting a higher total output and by a suitable arrangement, the anodes may be caused to direct or focus the X-rays on a predetermined area.

The apparatus shown in Fig. 2 is useful for therapeutic or radiographic work, it being a matter of mere design to provide an X-ray generator having a reasonably small focal spot to serve the purpose of the latter use. In this connection, if the device shown in Fig. 2 is to be put to radiographic use, the grids 76 and 77 and their associated grid bias cut-off transformers 50 and 51 may be eliminated.

The apparatus best adapted for radiographic use is shown in Figure 3.

Various changes may be made to the invention here disclosed, such as the omission of control grids 14 and 15 and 76 and 77, or the modification of the X-ray generator suggested above. Obvious safety features such as the overload relay 80 may be built into the circuits. However, the invention is not to be limited to the specific embodiment shown, but all modifications occurring to those skilled in the art are considered to be within the scope of the following claims.

We claim:

1. In an X-ray tube adapted to use an alternating current supply, means within the tube from which a plurality of streams of electrons will flow, means to control each of said streams so that each stream will flow during only a portion of each positive and negative half cycle of the alternating current, one of said streams being maintained by the alternate positive half cycles of the alternating current, and another of said streams being maintained by the alternate negative half cycles of the alternating current, and additional means within said tube against which said streams impinge whereby to cause X-rays to be generated during only a portion of each half cycle of the alternating current.

2. In an X-ray tube adapted to use an alternating current supply, means within the tube to create a plurality of streams of electrons, each stream flowing in a different path, one of said streams being maintained by the alternate positive half cycles of the alternating current, and another of said streams being maintained by the alternate negative half cycles of the alternating current, means within the path of each of said streams to control the flow of electrons so that a flow will take place during only a portion of each positive and negative half cycle of the alternating current, at least one terminus of each path being positioned outside of the other path, and means within said tube against which said streams impinge whereby to cause X-rays to be generated.

3. In an X-ray tube adapted to use an alternating current supply, means within the tube to create a plurality of streams of electrons, means to control each of said streams so that each stream will flow during only a portion of each positive and negative half cycle of the alternating current, one of said streams being maintained by the alternate positive half cycles of the alternating current, and another of said streams being maintained by the alternate negative half cycles of the alternating current, and additional means within said tube against which said streams impinge whereby to cause X-rays to be generated during only a portion of each half cycle of the alternating current.

4. An X-ray tube adapted to use an alternating current supply, a plurality of cathodes within said tube to create a corresponding plurality of streams of electrons, one of said streams being maintained by the alternate positive half cycles of the alternating current, and another of said streams being maintained by the alternate negative half cycles of the alternating current, an anode means within said tube against which said streams impinge, and means to control the flow of each of said streams whereby to cause X-rays to be generated during a portion only of each of said positive and negative half cycles.

5. In an X-ray tube adapted to use an alternating current supply, a plurality of cathodes within said tube to create a plurality of streams of electrons, one of said streams being maintained by the alternate positive half cycles of the alternating current, and the other of said streams being maintained by the negative half cycles of the alternating current, means within the path of each of said streams to control the flow of electrons so that a flow will take place during only a portion of each positive and negative half cycle of the alternating current, and an anode within said tube against which said streams impinge whereby to cause X-rays to be generated, means to energize said anode, said means including rectifying means electrically connected to each of said cathodes.

6. In an X-ray tube adapted to use an alternating current supply, a plurality of cathodes within said tube to create a plurality of streams of electrons, one of said streams being maintained by the alternate positive half cycles of the alternating current, and the other of said streams being maintained by the alternate negative half cycles of the alternating current, and a corresponding plurality of anodes within said tube against which said streams impinge whereby to cause X-rays to be generated, and a control grid between each pair of said cathodes and anodes.

7. In an X-ray tube adapted to use an alternating current supply, a plurality of cathodes within the tube to create a plurality of streams of electrons, one of said streams being maintained by the alternate positive half cycles of the alternating current, and another of said streams being maintained by the alternate negative half cycles of the alternating current, and an anode within said tube against which said streams impinge whereby to cause X-rays to be generated, and a control grid between each of said cathodes and said anode to control the flow of said streams of electrons.

8. In an X-ray system using an alternating current supply, an X-ray generator, said generator including means from which a plurality of streams of electrons will flow, means to control each of said streams so that each stream will flow during only a portion of each positive and negative half cycle of the alternating current, one of said streams being maintained by the alternate positive half cycles of the alternating current and another of said streams being maintained by the alternate negative half cycles of the alternating current, and additional means within said generator against which said streams impinge whereby to cause the production of X-rays during only a portion of each cycle of the alternating current, said system including transformer means to energize said generator, and said system being adapted to impress said alternate positive and negative half cycles upon said means within said generator.

9. In an X-ray system using alternating current, an X-ray tube having a plurality of anodes and a plurality of cathodes to cooperate with said anodes, a control grid positioned between each of said anodes and cathodes, an electrical circuit to receive the alternating current and adapted to energize said tube and control its operation, said circuit including a transformer for each of said cathodes and a transformer to create a bias on each of said grids, an auto transformer energized by said alternating current and being adapted to energize the primaries of said cathode and grid transformers, a transformer to energize said anodes, the primary of said last-named transformer receiving energy from said auto transformer, and a grid cut-off transformer for each of said control grids, the secondary of each of said filament and grid bias transformer being connected to the primary of said grid cut-off transformer, the other side of said grid cut-off primary being connected to the secondary of said anode transformer, the other side of the secondary of said grid bias transformers being connected to the secondary of said grid cut-off transformers, the secondary of said grid cut-off transformer being connected to said grid, said circuit being operative to control the grid bias of said grids and to successively cause each half cycle of a single cycle of said alternating current to produce X-rays within said tube.

10. In an X-ray system adapted to use an alternating current supply, an X-ray generator, said generator including means therein from which a plurality of streams of electrons will flow, one of said streams being maintained by the alternate positive half cycles of the alternating current, and another of said streams being maintained by the alternate negative half cycles of the alternating half current, and additional means within said generator against which said streams impinge whereby to cause the production of X-rays, and control grids between said first two named means, said system including means to control the bias charge on said grids, said grid bias charge being effective to control the flow of said streams of electrons.

11. In an X-ray system adapted to use an alternating current, means within the path of each of said streams to control the flow of electrons so that a flow will take place during only a portion of each positive and negative half cycle of the alternating current, an X-ray generator having an anode and a plurality of cathodes, said generator including a rectifying means connected between said cathode and anode, means to energize said generator, said last named means being effective in cooperation with the elements of said generator to create a plurality of streams of electrons, one of said streams being maintained by the alternate positive half cycles of said alternating current supply and another of said streams being maintained by the alternate negative half cycles of said current, each of said streams flowing from its corresponding cathode to said anode whereby to produce X-rays.

12. An X-ray apparatus adapted to utilize both the positive and negative halves of each cycle of alternating current, including a circuit to receive the current, an X-ray generator in said circuit, means within said generator from which a plurality of streams of electrons will flow, means to control each of said streams whereby each stream will flow during only a portion of each positive and negative half cycle of the alternating current, one of said streams being maintained by the alternate positive half cycles of the alternating current, and another of said streams being maintained by the alternate negative half cycles of the alternating current, and additional means within said generator against which said streams impinge whereby to cause X-rays to be generated during only a portion of each half cycle of the alternating current, and means electrically connected with said circuit to indicate the functioning of said generator.

13. An X-ray apparatus adapted to utilize both the positive and negative halves of each cycle of alternating current, including a circuit to receive the current, an X-ray generator in said circuit, means within said generator from which a plurality of streams of electrons will flow, one of said streams being maintained by the alternate positive half cycles of the alternating current, and another of said streams being maintained by the alternate negative half cycles of the alternating current, and additional means within said generator against which said streams impinge whereby to cause X-rays to be generated, a direct current meter connected in said circuit to indicate the balance between said streams of electrons, and an alternating current meter in said circuit to indicate the output of said generator.

14. In an X-ray system adapted to use an alternating current, an X-ray generator having an anode and a plurality of cathodes sealed in an envelope, rectifying means associated with said generator connected between said cathode and anode, means to energize said generator and said rectifying means, said energizing means being effective in cooperation with said generator and said rectifying means to create a plurality of streams of electrons, one of said streams being maintained by the alternate negative half cycles of said current, means within the path of each of said streams to control the flow of electrons so that a flow will take place during only a portion of each positive and negative half cycle of the alternating current, each of said streams flowing from its corresponding cathode to said anode whereby to produce X-rays.

GEORGE W. HAUG.
HARRY B. McEUEN.